| United States Patent [19] | [11] | 4,401,788 |
|---|---|---|
| Hiyoshi et al. | [45] | Aug. 30, 1983 |

[54] VINYLIDENE CHLORIDE COPOLYMER LATEX

[75] Inventors: Kazuhiko Hiyoshi; Atsushi Sugizaki, both of Nobeoka, Japan

[73] Assignee: Asahi-Dow Limited, Tokyo, Japan

[21] Appl. No.: 344,327

[22] Filed: Feb. 1, 1982

[51] Int. Cl.³ .............................................. C08L 27/08
[52] U.S. Cl. ................... 524/714; 524/724; 524/747; 524/755; 524/819; 524/836
[58] Field of Search ............... 524/747, 724, 833, 811, 524/714, 755, 819, 836

[56] References Cited

U.S. PATENT DOCUMENTS

| 3,696,082 | 10/1972 | Smith | 524/833 |
|---|---|---|---|
| 3,736,303 | 5/1973 | Smith et al. | 524/833 |
| 3,819,557 | 6/1974 | Loeffler et al. | 524/833 |
| 3,919,156 | 11/1975 | Khanna et al. | 524/833 |
| 4,013,604 | 3/1977 | Teer et al. | 524/747 |
| 4,018,737 | 4/1977 | Teer et al. | 524/747 |
| 4,094,841 | 6/1978 | Mani | 524/831 |
| 4,150,210 | 4/1979 | Anderson et al. | 524/747 |
| 4,239,669 | 12/1980 | Scott et al. | 524/747 |
| 4,296,013 | 10/1981 | Gibbs | 524/833 |

FOREIGN PATENT DOCUMENTS

| 748479 | 12/1966 | Canada | 524/747 |
|---|---|---|---|
| 2809260 | 9/1979 | Fed. Rep. of Germany | 524/747 |
| 53-41335 | 4/1978 | Japan | 524/747 |

*Primary Examiner*—Ronald W. Griffin
*Attorney, Agent, or Firm*—D. R. Howard

[57] ABSTRACT

An emulsion polymerized vinylidene chloride copolymer latex having polymerized therein vinylidene chloride and one or more ethylenically unsaturated monomers copolymerizable therewith. The latex contains both an anionic and a nonionic surfactant. The latex remains stable following addition of about 2 percent by weight of a cationic antistatic agent on a polymer solids basis.

8 Claims, No Drawings

VINYLIDENE CHLORIDE COPOLYMER LATEX

BACKGROUND OF THE INVENTION

The present invention relates to a latex of vinylidene chloride copolymer obtained by emulsion copolymerization of vinylidene chloride and one or more monomers copolymerizable therewith using an anionic surfactant and a nonionic surfactant.

More particularly, the present invention relates to a vinylidene chloride copolymer latex: (1) which is excellent in stability when polymerized; (2) which hardly yellows with the lapse of time despite using a nonionic surfactant predominantly; and (3) which unexpectedly improves in stability when a cationic surfactant is added despite containing an anionic surfactant.

Heretofore, almost all vinylidene chloride copolymer latices have been prepared by emulsion polymerization in the presence of an anionic surfactant. It has scarcely been found that they are prepared by the use of a nonionic surfactant in emulsion polymerization. It has been found that a vinylidene chloride resin latex obtained by using such an anionic surfactant is markedly unstable when an electrolyte coexists. Consequently, for instance, in an application such as addition of a vinylidene chloride latex to a mortar, there has been adopted a countermeasure of using a nonionic surfactant together with an anionic one to prevent agglomeration due to inorganic electrolytes. However, in uses such as coating a plastic film, one will face difficulties when one wishes to use a cationic antistatic agent which has an opposite polarity to that of an anionic surfactant to acquire a high antistatic performance. From this point of view, it is known that, if a vinylidene chloride resin latex is obtained using only a nonionic surfactant, the stability thereof against an electrolyte is satisfactory when an inorganic salt or a salt of either anionic or cationic organic material is added thereto.

The vinylidene chloride resin latex obtained using a nonionic surfactant is obviously theoretically advantageous and highly desired in industries. However, such a latex can be scarcely found in the world. It is believed that this scarcity is due predominantly to the difficulty in maintaining the stability of colloid in polymerization when the emulsion copolymerization of vinylidene chloride resin is carried out using only a nonionic surfactant. In other words, there can be obtained only a product having a markedly poor mechanical stability. Secondly, even if a latex can be obtained, a film produced therefrom yellows rapidly with time. Thus, there can only be obtained a latex having a markedly low commercial value.

The present inventors started this investigation to satisfactorily solve the problem of difficulties or disadvantages which appear when a nonionic surfactant is used and to obtain a vinylidene chloride resin latex having an outstanding chemical stability. They found that the amount of surfactant used should be as small as possible in order to suppress to some extent the yellowing with time of a vinylidene chloride resin latex obtained using a nonionic surfactant. Needless to say, the stability of a latex obtained by emulsion polymerization is improved as the amount of coexisting surfactant is increased. Moreover, a latex obtained using a nonionic surfactant tends to have a mechanical stability inferior to that of a latex obtained using an anionic surfactant. Accordingly, a larger amount of nonionic surfactant is required which makes the problem more difficult. The present inventors eagerly investigated under such difficult conditions and found a fact mentioned below.

That is, it was found that the emulsion copolymerization of vinylidene chloride resin using a nonionic surfactant together with a very small amount of an anionic surfactant in accordance with a particular method shows an extremely high polymerization stability. The vinylidene chloride resin latex so obtained is markedly improved in yellowing with time which is a defect of vinylidene chloride resin latex obtained using only a nonionic surfactant. The vinylidene chloride latex so obtained shows not only an outstanding stability against the addition of an electrolyte in spite of the coexistence of an anionic surfactant but also an unexpected improvement in mechanical stability when a cationic surfactant is added. The present invention was achieved on the basis of finding this fact.

SUMMARY OF THE INVENTION

Thus, the present invention relates to a vinylidene chloride copolymer latex in the form of an aqueous dispersion of a copolymer resin, the copolymer resin predominantly comprising polymerized vinylidene chloride as the main component, the latex characterized by dispersed polymer particles having an average particle size of from about 1300 Å to 2000 Å when measured by light-scattering; the latex containing 0.05 to 0.5 percent by weight (hereinafter percent by weight is referred to as percent) of an anionic surfactant and 3 to 5 percent of a nonionic surfactant both on a polymer solids basis; and the latex having a Klaxon mechanical stability of 30 minutes or more when 2 percent of a cationic surfactant is added to said latex on a polymer solids basis.

DESCRIPTION OF THE PREFERRED EMBODIMENTS

The content of polymerized vinylidene chloride which is the main component of the vinylidene chloride resin latex in the present invention is 50 to 95 percent on a polymer solids basis. When the content is less than 50 percent, the performance due to the main component vinylidene chloride is not revealed satisfactorily. However, when the vinylidene chloride content exceeds 95 percent, processability is lost because of the excessively high crystallinity.

In the vinylidene chloride resin latex of the present invention, the comonomer to be copolymerized with vinylidene chloride by emulsion copolymerization may be any one of ethylenically unsaturated compounds which have sufficiently capability to be copolymerized with vinylidene chloride. However, from the viewpoints of availability and the like, acrylic acid, methacrylic acid and their esters, nitriles and amides are illustrated as industrially useful comonomers.

The anionic surfactant used in the present invention has to be a salt of a strong acid which sufficiently dissociates at a low pH which is a characteristic of vinylidene chloride resin latexes. Consequently, there are used sodium alkylbenzenesulfonate, sodium salt of alkyl sulfonic acid ester, sodium salt of sulfosuccinic acid alkyl ester, sodium alkylsulfonate, sodium alkyldiphenylether sulfonate, sulfuric acid ester of alkylphenolpolyethylene oxide and the like.

The nonionic surfactant used in the present invention can be selected from alkyl or alkylphenol ethers and higher fatty acid esters of polyethylene oxide. However, in case of the vinylidene chloride resin latex of the present invention, the highest stability can be obtained by using polyoxyethylenenonylphenylether (EO: 35) which is described in Japanese patent publication No. 14676/1966. As used herein, the parenthetical notation (EO: 35) denotes an average number of ethylene oxide repeat units. Satisfactory results may be obtained when the average number of ethylene oxide repeat units is from 15 to 40.

The amount of the anionic surfactant used in the present invention may be, as described in examples to be mentioned hereinafter in detail, sufficient as far as it makes a seed latex produce in a stable state. That is, the amount is sufficient when it is about 0.1 percent on the basis of the total monomer weight used. However, after the production of the seed latex, even if a small amount of a cationic surfactant is further added to obtain an extra stability, the stability of the latex is not lowered by the addition of a cationic antistatic agent and like actions as far as the total amount of anionic surfactant therein does not exceed 0.5 percent on the basis of the solids content.

One of the features of this invention exists in the very small quantity of nonionic surfactant used, namely 5 percent or less on a polymer solids basis. It is shown by examples described later that the latex of the present invention has a sufficient stability though the amount of the nonionic surfactant is such a small one. However, when the nonionic surfactant content is less than 3 percent on a polymer solids basis, a latex having a sufficient stability is not produced.

The average particle size of the vinylidene chloride resin latex of the present invention when measured in accordance with light-scattering is from 1300 Angstroms (Å) to 2000 Å. When the average particle size is less than 1300 Å, yellowing of the latex with time becomes pronounced in spite of the small amount of the nonionic surfactant as mentioned above. On the contrary, when the average particle size is too large exceeding 2000 Å, the latex has a poor mechanical stability and the precipitation of the latex with time is rapidly caused even if it is prepared according to the method of the present invention.

As a cationic surfactant of the present invention, a salt of quarternary amine is widely used. The quantity of a cationic surfactant used is based on the antistatic performance required when the vinylidene chloride resin latex is applied on a plastic film, namely, it is usually required to add 1–1.5 percent of a commercial cationic surfactant. However, from the viewpoint of the safety on the stability against an electrolyte, it is necessary that the latex has such a level as allowing the addition of the cationic surfactant up to 2 percent.

The Klaxon mechanical stability mentioned is, as mentioned later in test methods, measured under exposure of the latex to a high shearing stress. A suitable vinylidene chloride resin latex is one which results in no agglomeration thereof even after being subjected to such a shearing stress for 30 minutes.

Hereinbelow the present invention will be described in detail with practical examples. However, prior to it, test methods will be mentioned. The abbreviation JIS stands for Japanese Institute of Standards. The alphanumeric characters following JIS refer to the specific test number. All parts and percentages are by weight unless otherwise stated.

1. Average Particle Size (JIS B-9921)

Measurement was made with a photoelectric light-scattering photometer (Model PG-21), product of Shimazu Seisakusho K.K.

2. Klaxon Mechanical Stability (JIS K-6381)

To each vinylidene chloride copolymer latex 2 percent by weight of ETHOQUAD brand cationic antistatic agent (manufactured by Lion K.K.) was added on a polymer solids basis. The cationic antistatic agent is represented by the formula:

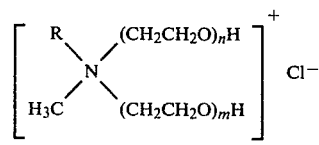

wherein R is an alkyl and n and m are integers having values from 2 to 15. Thus obtained latex was subjected to the shear stress given by a disk rotating at 8,000 rpm for 30 minutes. Time was computed until agglomeration occurred. A latex was rated as acceptable which showed no agglomeration within 30 minutes.

3. Polymerization Stability

Each of sample latexes was filtered with a 200 mesh stainless steel screen to separate out precipitates, which were then air dried and weighed. Polymerization stability was expressed as a ratio of the precipitate weight to the total weight of monomers used.

4. Color Stability

Standard yellow dispersions were prepared by yellowing a commercial Styrene-Butadiene (SB) latex with dyes. In this case a latex which did not discolor with aging was used. The latexes of this invention and other latex samples were evaluated by comparing with the standard yellow dispersions, which were prepared as follows:

Grade 10 Dispersion

In Grade 1 dispersion 85 parts per million (ppm) of quinoline yellow WS and 10 ppm of alizarin yellow R were dissolved to prepare the Grade 10 dispersion of which color was very similar to that of a conventional nonionic surfactant containing vinylidene chloride copolymer latex having no commercial value due to remarkable discoloration with aging.

Grade 9 Dispersion

Grade 10 dispersion most yellowed was diluted 1.5 times with Grade 1 dispersion having no yellow color to prepare Grade 9 dispersion.

Grade 8 Dispersion

Grade 10 dispersion was diluted 2 times with Grade 1 dispersion to prepare Grade 8 dispersion.

Grade 7 Dispersion

Grade 10 was diluted 3 times with Grade 1 to prepare Grade 7.

Grade 6 Dispersion

Grade 10 was diluted 5 times with Grade 1 to prepare Grade 6.

Grade 5 Dispersion

Likewise, Grade 10 was diluted 7 times with Grade 1.

Grade 4 Dispersion

Grade 10 was diluted 10 times with Grade 1.

Grade 3 Dispersion

Grade 10 was diluted 15 times with Grade 1.

Grade 2 Dispersion

Grade 10 was diluted 30 times with Grade 1.

Grade 1 Dispersion

L2803 SB latex manufactured by Asahi-Dow Limited was diluted double with water to obtain Grade 1 dispersion.

In comparison with these standard dispersions, commercial anionic surfactant containing vinylidene chloride copolymer latexes were rated at Grade 3 or 4. Latexes rated Grade 5 or 6 could be used in some applications.

EXAMPLE 1

To a hermetically sealable one liter glass bottle used as a reactor, 100 parts of water, 0.1 part of sodium lauryl sulfate, 0.1 part of sodium persulfate were added to prepare an aqueous solution. A monomer mixture consisting of 9 parts of vinylidene chloride, 0.6 part of methyl acrylate and 0.4 part of methyl methacrylate was added to the aqueous solution to obtain a mixture. The mixture was reacted under agitation while keeping it at a temperature of 50 degrees Centigrade (°C.) for 22 hours to produce a seed latex. 3.6 parts of polyoxyethylene nonylphenyl ether (EO: 35), 0.4 part of sodium lauryl sulfate, 81 parts of vinylidene chloride, 5.4 parts of methyl acrylate and 3.6 parts of methyl methacrylate were then added batchwise to the seed latex. The obtained mixture was further subjected to reaction for 50 hours to produce a latex of this invention.

EXAMPLE 2

To a hermetically sealable one liter glass bottle used as a reactor, 84 parts of water, 0.1 part of a sodium alkylsulfonate and 0.1 part of sodium persulfate were added to prepare a solution. The sodium alkylsulfonate is a sodium salt of an alkane sulfonic acid of linear paraffins having chain lengths of from 10 to 18 carbon atoms provided that at least 50 percent of the paraffins have chain lengths of from 14 to 16 carbon atoms. A monomer mixture consisting of 88 parts of vinylidene chloride, 6 parts of methyl acrylate, 4 parts of methyl methacrylate, 1 part of acrylonitrile and 1 part of glycidyl methacrylate was prepared. Ten percent of thus prepared monomer mixture was added to the previously obtained solution in the reactor to obtain a first mixture. The first mixture was reacted under agitation at 50° C. for 22 hours to produce a seed latex. An aqueous solution of 0.4 part sodium alkyl sulfonate, an aqueous solution of 3.6 part polyoxyethylenenonylphenyl ether (EO: 35) and remaining 90 percent of the monomer mixture were added batchwise to the seed latex and polymerization was continued for an additional 50 hours to obtain a latex of this invention.

EXAMPLE 3

A monomer mixture consisting of 9 parts of vinylidene chloride, 0.6 part of methyl acrylate and 0.4 part of methyl methacrylate was mixed with an aqueous solution consisting 80 parts of water, 0.1 part of sodium polyoxyethylenenonylphenylether to obtain a first mixture. The first mixture was reacted under agitation in a glass-lined hermetically sealed 34 liter reactor while maintaining a temperature of 50° C. for a period of 3 hours to prepare a seed latex. An aqueous solution containing 5 parts of polyoxyethylenenonylphenylether (EO: 35) was added batchwise to the seed latex. A mixture consisting of 81 parts of vinylidene chloride, 5.4 parts of methyl acrylate, 3.6 parts of methyl methacrylate and 2 parts of glycidyl methacrylate was then added continuously at a constant rate for 10 hours while proceeding with polymerization to obtain a latex of this invention.

EXAMPLE 4

The same procedure as in Example 3 was repeated except for that 0.07 part of sodium alkyldiphenylether sulfonate was used as anionic surfactant and that the quantity of the nonionic surfactant was 4.5 parts.

REFERENCE 1

The same procedure as in Example 4 was repeated except for that the quantity of sodium alkyldiphenylether sulfonate was 0.2 part instead of 0.07 to obtain a latex in which the average particle size was 1,300 Angstroms or smaller.

REFERENCE 2

The same procedure as in Example 4 was repeated except for that the quantity of sodium alkyldiphenylether sulfonate was 0.05 part instead of 0.07 part. Precipitates were observed after polymerization. The particle size of the obtained latex was 1,800 Angstroms or more.

REFERENCE 3

The same procedure as in Example 4 was repeated except for that the quantity of the nonionic surfactant was 2.5 parts. The reaction system coagulated, so that no latex was obtained.

REFERENCE 4

The same procedure as in Example 4 was repeated except for that the quantity of the nonionic surfactant was 6 parts. A stable latex which yellowed in a short time was obtained.

REFERENCE 5

To the latex obtained in Example 4, 0.5 percent by weight of sodium alkyldiphenylether sulfonate was added on a polymer solids basis. The thus prepared latex was not acceptable in mechanical stability when a cationic surfactant was added. The thus prepared latex was also inferior in electrolyte stability.

As can be shown in Table 1, the latexes of the present invention are satisfactory in polymerization stability, mechanical stability and electrolyte stability.

TABLE 1

| | Anionic Surfactant (%) | Nonionic Surfactant (%) | Polymerization Stability (%) | Average Particle Size (A) | Klaxon Mechanical Stability When Cationic Surfactant Added (minutes) | Yellowing with Aging at 40° C. (grade) | | | | Remarks |
|---|---|---|---|---|---|---|---|---|---|---|
| | | | | | | 0 Day | 15 Days | 30 Days | 45 Days | |
| Example 1 | 0.5 | 3.6 | 0.3 | 1,460 | 30 or more | 2 | 2 | 2–3 | 3–4 | |
| Example 2 | 0.5 | 3.6 | 0.5 | 1,450 | 30 or more | 2 | 2 | 2–3 | 3–4 | |
| Example 3 | 0.1 | 5.0 | 0.3 | 1,465 | 30 or more | 2 | 2–3 | 2–3 | 4 | |
| Example 4 | 0.07 | 4.5 | 0.1 | 1,805 | 30 or more | 2 | 2 | 2–3 | 3 | |
| Reference 1 | 0.2 | 4.5 | 0.1 | 1,020 | 30 or more | 2 | 3–4 | 5 | 7 | Unstable, precipitated while stored at 40° C. |
| Reference 2 | 0.05 | 4.5 | 8.2 | 2,140 | 25–30 | 2 | 2 | 2–3 | 3 | |
| Reference 3 | 0.07 | 2.5 | Coagulated | — | — | — | — | — | — | |
| Reference 4 | 0.07 | 6.0 | 0.1 or less | 1,790 | 30 or more | 2 | 3 | 3–4 | 6 | |
| Reference 5 | 0.07 + 0.5 | 4.5 | Nil | 1,805 | 5 or less | — | — | — | — | |

What is claimed is:

1. A vinylidene chloride copolymer latex in the form of an aqueous dispersion of a copolymer resin, the copolymer resin predominantly comprising polymerized vinylidene chloride as the main component, the latex characterized by dispersed polymer particles having an average particle size of from about 1,300 to 2,000 Angstroms when measured by light scattering; the latex containing 0.05 to 0.5 percent by weight of an anionic surfactant and 3 to 5 percent by weight of a nonionic surfactant both on a polymer solids basis; and the latex having a Klaxon mechanical stability of 30 minutes or more when 2 percent by weight of a cationic surfactant is added to said latex on a polymer solids basis.

2. The vinylidene chloride copolymer latex of claim 1 wherein the copolymer has polymerized therein an ethylenically unsaturated monomer copolymerizable with vinylidene chloride.

3. The vinylidene chloride copolymer latex of claim 2 wherein the ethylenically unsaturated monomer is selected from the group consisting of acrylic acid, methacrylic acid, acrylic acid esters, methacrylic acid esters, nitriles and amides.

4. The vinylidene chloride copolymer latex of claim 1 wherein the anionic surfactant is selected from the group consisting of sodium alkylbenzenesulfonate, sodium salts of alkyl sulfonic acid esters, sodium salts of sulfosuccinic acid alkyl esters, sodium alkylsulfonate, sodium alkyldiphenylether sulfonate, and sulfuric acid esters of alkylphenolpolyethylene oxide.

5. The vinylidene chloride copolymer latex of claim 1 wherein the nonionic surfactant is selected from the group consisting of alkyl ethers, alkylphenol ethers and higher fatty acid esters of polyethylene oxide.

6. The vinylidene chloride copolymer latex of claim 1 wherein the nonionic surfactant is a fatty acid ester of polyethylene oxide having an average number of ethylene oxide repeat units of from 15 to 40.

7. The vinylidene chloride copolymer latex of claim 1 wherein the cationic surfactant is a salt of a quaternary amine.

8. The vinylidene chloride copolymer latex of claim 1 wherein the cationic surfactant is a salt of a quaternary amine represented by the formula:

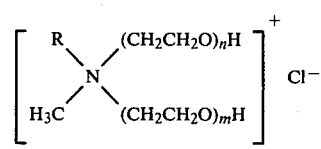

wherein R is an alkyl and n and m are integers having values from 2 to 15.

* * * * *